United States Patent [19]

Mochizuki et al.

[11] Patent Number: 4,737,896

[45] Date of Patent: Apr. 12, 1988

[54] ILLUMINATION DEVICE

[75] Inventors: Noritaka Mochizuki, Yokohama; Akio Yoshida, Fujisawa; Makoto Ogura; Tatsundo Kawai, both of Hiratsuka, all of Japan

[73] Assignee: Canon Kabushiki Kaisha, Tokyo, Japan

[21] Appl. No.: 887,423

[22] Filed: Jul. 21, 1986

[30] Foreign Application Priority Data

Jul. 23, 1985 [JP] Japan .................. 60-162290

[51] Int. Cl.⁴ .................. F21V 7/00; G02F 1/13; G09G 3/18
[52] U.S. Cl. .................. 362/301; 362/335; 362/339; 362/325; 362/23; 340/784; 340/765; 350/345; 350/330

[58] Field of Search .............. 362/300, 296, 299, 301, 362/308, 309, 326, 329, 335, 337, 339, 328, 23; 350/345, 330; 340/784, 765

[56] References Cited

U.S. PATENT DOCUMENTS

| | | | |
|---|---|---|---|
| 3,586,851 | 6/1971 | Rudolph | 362/301 X |
| 4,068,924 | 1/1978 | Kotani | 362/335 X |
| 4,212,048 | 7/1980 | Castleberry | 362/301 X |
| 4,510,560 | 4/1985 | Negishi | 362/299 |

Primary Examiner—Larry Jones
Attorney, Agent, or Firm—Fitzpatrick, Cella, Harper & Scinto

[57] ABSTRACT

An illumination device is provided which comprises a light source, a first light-deflecting means for converting the rays emitted from the light source into parallel rays and a second light-deflecting means for directing the parallel rays to an object to be illuminated.

14 Claims, 4 Drawing Sheets

ILLUMINATION DEVICE

BACKGROUND OF THE INVENTION

1. Field of the Invention

This invention relates to an illumination device. More particularly, the present invention relates to a plane illumination device for illuminating display panels of liquid crystal television, etc. from the back.

2. Related Background Art

In a liquid crystal display panel, display is effected by discriminating electrooptical modulation of liquid crystals by means of reflected light from an irregular reflection plate placed at the back of the display panel, or otherwise by switching the liquid crystal to control light introduced from the back of the display panel. In general, the former panel is called a reflection-type liquid crystal and the latter panel is called a transmission-type liquid crystal panel. While these two kinds of liquid crystal panels have respective advantages, the transmission-type liquid crystal panel is particularly suitable for use as a display panel for office equipment.

Conventional illumination devices used for transmission-type liquid crystal panels employ a plurality of fluorescent lamps and a light-diffusing screen. However, these illumination devices have drawbacks in that they consume a large amount of electricity when used for display panels of large area (e.g. diagonal size of 12 inches) because of required larger number of fluorescent lamps for illumination and the resulting non-uniform light for illumination. Therefore, plane illumination devices as shown in FIG. 1 are currently in use. In FIG. 1, rays 151 emitted from a light source 11 reflect totaly on a curved reflection plane 12 of a transparent block component 10 and again on the reflection plane portions 13 of a minute-prism array. The reflected rays 152 are converted into diffused rays 153. The diffused rays 153 can illuminate a liquid crystal panel 17 from the back.

This plane illumination device, however, have the following drawbacks. The utilization factor of the rays supplied from the light source is low; a large amount of elecrtricity is consumed for illuminating the liquid crystal to give a sufficient brightness; and the rays for the illumination is inferior in directivity. Accordingly, the net light amount for illuminating the portions of the liquid crystal to be observed becomes inefficient.

SUMMARY OF THE INVENTION

An object of the present invention is to provide a plane illumination device wherein the rays supplied from a light source is utilized at a high degree and which provides rays of superior directivity for illumination.

Another object of the present invention is to provide a plane illumination device suitable for use as a back light for transmission-type liquid crystal panels.

According to the present invention, there is provided an illumination device comprising a light source, a first light-deflecting means for converting the rays emitted from the light source into parallel rays and a second light-deflecting means for directing the parallel rays to an object to be illuminated.

DETAILED EXPLANATION OF PREFERRED EMBODIMENT OF THE INVENTION

Figure 1:
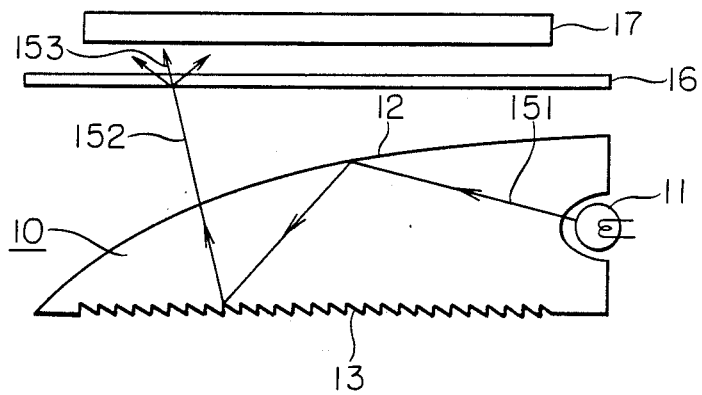
FIG. 1 is a sectional view of a conventional illumination device.
Figure 2:
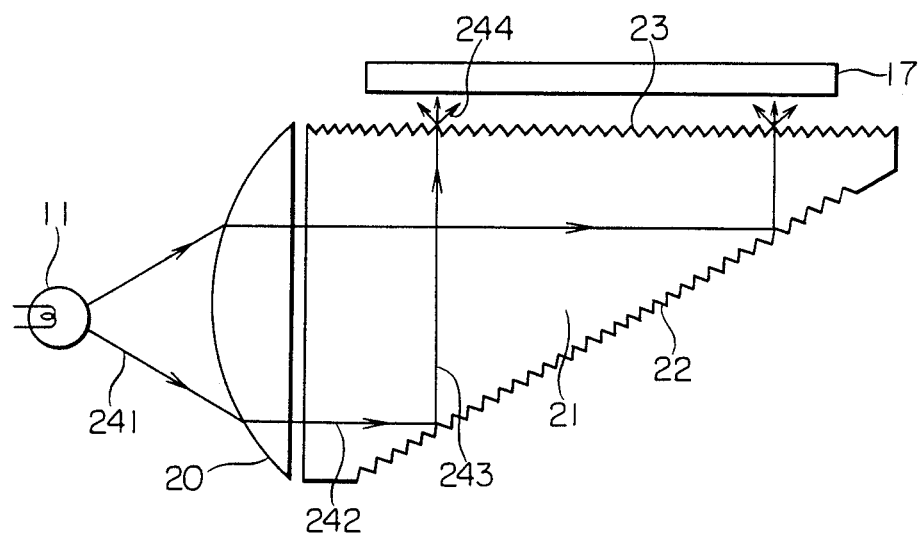
FIG. 2 is a sectional view of an illumination device of the present invention.
Figure 3:
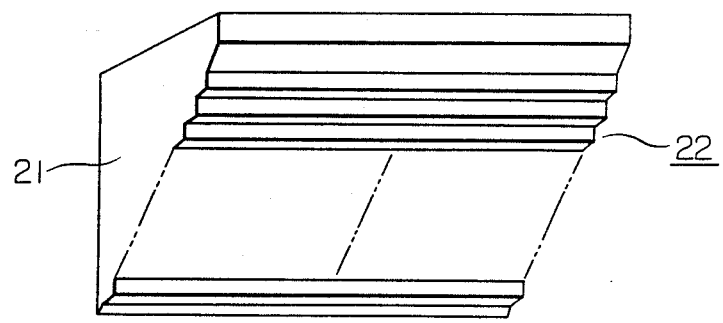
FIG. 3 is a perspective view of a light-guiding member used in the device of the present invention.
Figure 4:
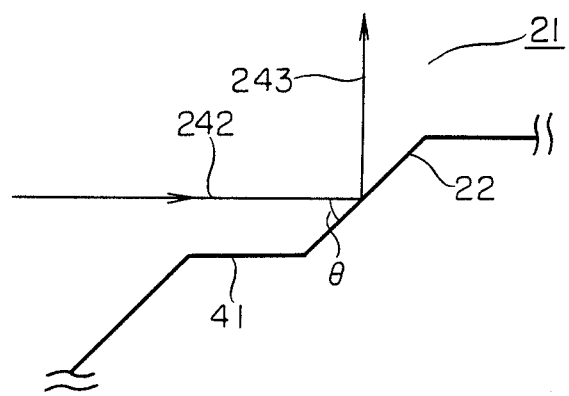
FIG. 4 is an enlarged sectional view of an inclined prism array employed in the present invention.

FIG. 2 is a sectional view of an illustration device of the present invention. FIG. 3 is a perspective view of a light-guiding member having planes of an inclined minute-prism array, used in the illumination device of FIG. 2. FIG. 4 is an enlarged sectional view of the planes of the inclined minute-prism array of FIG. 3.

The illumination device of the present invention comprises (a) a first light-deflecting means equipped with a convex lens 20 for converting the rays 241 emitted from a light source 11 into parallel rays 242, and (b) a second light-deflecting means equipped with a light-guiding member 21 having plane portions 22 of an inclined prism array and with a light-scattering plane 23. With the illumination device of the present invention, the rays 241 emitted from the light source 11 placed at the focal point of the convex lens 20 are converted into parallel rays 242; the parallel rays 242 enter the light-guiding member 21 and reflect totally on the minute plane portions 22 of the inclined minute-prism array whereby the parallel rays 242 are converted into total reflection rays 243; the total reflection rays 243 are converted into diffused rays 244 on the light-scattering plane 23 of the light-guiding member 21; and the diffused rays 244 illuminate a liquid crystal panel 17 which is an object to be illuminated.

Preferably, each minute prism of the inclined prism array used in the present invention has an angle $\theta$ of 45° or smaller with the axis of the parallel rays 242. Also preferably, the inclined prism array, when the object to be illuminated is a liquid crystal panel, is provided in such a way that each prism of the prism array has a pitch equal to or smaller than the pitch of the picture elements formed on the liquid crystal panel. For instance, when the liquid crystal panel comprises 16 picture elements per 1 mm, the inclined prism array is desirably provided so as to have 16 or more prisms per 1 mm, and further the plane portions 22 of the inclined prism array having an angle $\theta$ to the parallel rays 242 is desired to oppose the picture elements of the liquid crystal panel. In this case, therefore, the amount of the rays which can transmit through the picture elements becomes maximum when the picture elements are in open state. Meanwhile, the plane portions 41 of the prism array parallel to the parallel rays 242 oppose the portions of the liquid crystal panel portions other than the picture elements and accordingly these portions of the liquid crystal are illuminated by the minimum amount of rays, thus providing a picture of high contrast on the display panel.

On the picture formed on liquid crystal panel 17, a plurality of picture elements are arranged in lines and rows. Each picture element is controlled to be either in a open state or in a closed state. A picture is displayed by switching the ray of the back light through the controlled picture element. The control of the picture elements is effected generally in accordance with the information signal from the scanning line and the data line wired to the picture elements. For the liquid crystal panel 17, an active matrix system of displaying images, a twisted nematic system for a dot-matrix picture, or a system for a dot-matrix picture employing ferroelectric liquid crystals may be used. In the active matrix system, each picture element on the same line is commonly wired to the gates of a thin film transistors (TFT's), and the picture elements in the same line are commonly wired to the gates of TFT's and the information signal is applied sequentially to each line from the source of the TFT's in synchronization with the gate-on-pulse.

The light-guiding member 21 employed in the illumination device of the present invention may be a transparent material made from glass, a synthetic resin or the like. However, it may be a colored transparent component depending upon the application purpose of the present device. The light-scattering plane 23 of the light-guiding member 21 can be a rough plane formed by a non-glare treatment.

The plane portions 22 of the inclined prism array can be covered by a reflective metal film of aluminum, silver, chromium or the like to increase the utilization factor of the rays supplied from the light source 11.

The light source 11 used in the present apparatus can be selected from various light sources. Specific examples include a long fluorescent lamp, a long incandescent electric lamp (e.g. a halogen lamp), a long LED (light-emitting diode), etc.

Figure 5:
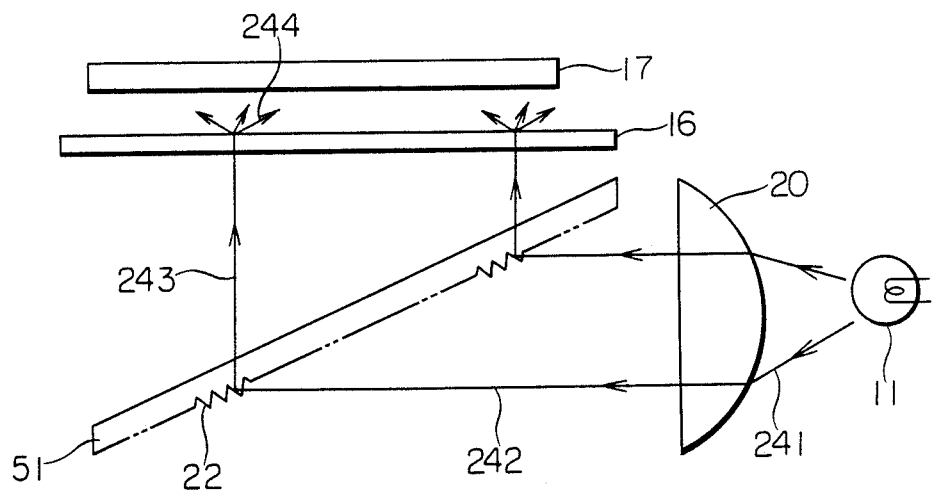
FIGS. 5 and 6 are each a sectional view of an illumination device of the present invention in other embodiment.
Figure 7:
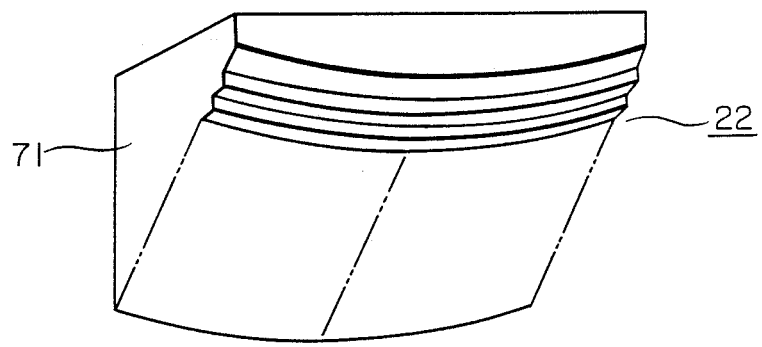
FIG. 7 is a perspective view of a light-guiding member of other embodiment used in the devices of the present invention.
Figure 6:
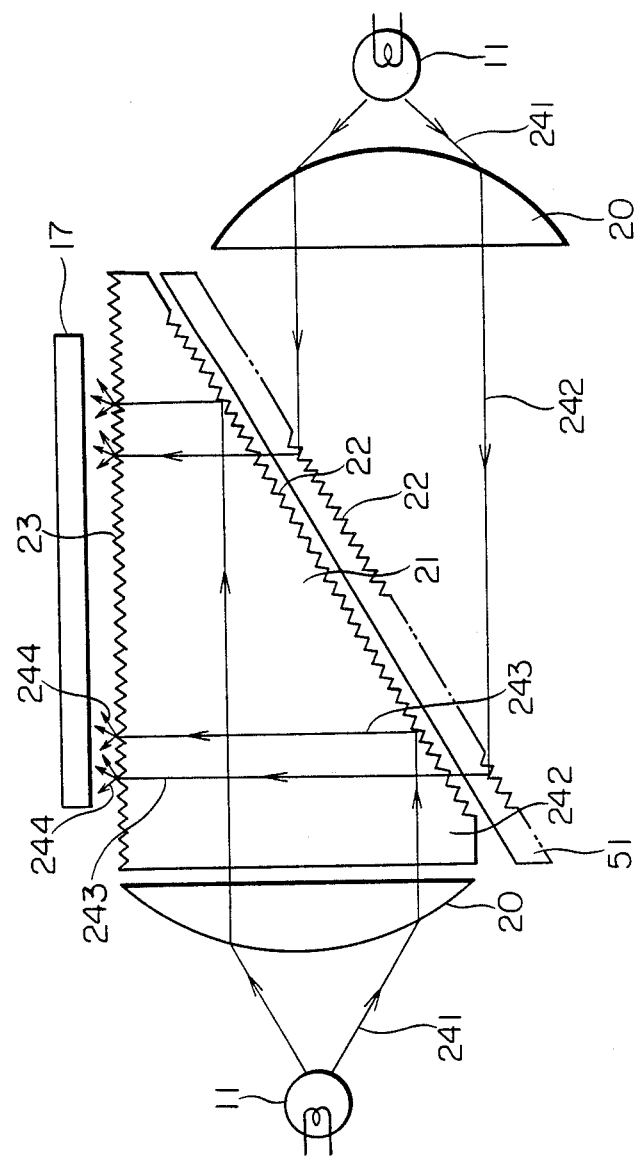

FIGS. 5 to 7 show other embodiments of the illumination device of the present invention.

The illumination device shown in FIG. 5 comprises a first light-deflecting means using a convex lens 20 for converting the rays 241 emitted from a light source 11 to parallel rays, and a second light-deflecting means using a transparent plate 51 having plane portions 22 of an inclined prism array. In FIG. 5, the same numerical symbols as in FIG. 2 represent the same member as in FIG. 2, respectively.

FIG. 6 shows an embodiment of a composite type of illumination device which is virtually a combination of the devices of FIG. 2 and FIG. 5. In FIG. 6, the same numerical symbols as in FIGS. 2 and 5 represent the same members as in FIGS. 2 and 5, respectively.

In the illumination device of FIG. 6, light sources 11 are arranged at the both sides of the light-deflecting means, thus enabling intense illumination. Further, the rays of good directivity can illuminate a liquid crystal panel uniformly from the back.

FIG. 7 is a perspective view of a light-guiding member 71 wherein the plane portions 22 of the inclined prism array are curved. In the illumination device of the present invention, this light-guiding member 71 can be used in place of the light-guiding member 21 of FIG. 2. With the light-guiding member 71 having the curved plane portions 22, the parallel rays which have entered the light-guiding member 71 reflect on the curved plane portions 22 so that the reflected rays are directed toward the center of the prism array, whereby the rays illuminating a liquid crystal panel can have an improved directivity property.

With the use of the illumination device of the present invention, the utilization of the rays from a light source becomes higher and rays of superior directivity can be obtained. When the present device is applied as a back light device for transmission-type liquid crystal panels, a display two times brighter or more than the conventional display can be provided.

What we claim is:

1. An illumination device comprising:
   a. a light source;
   b. a display panel having picture elements arranged in rows and columns, each of the picture elements being independently controlled to be either in an open state or in a closed state;
   c. A first light-deflecting means for converting the rays emitted from the light source into parallel rays; and
   d. a second light-deflecting means having a reflection plane for directing the parallel rays to the display panel, the reflection plane being formed by a prism array, and the pitch between the prisms in the prism array being smaller than the pitch between the image elements in the display panel.

2. An illumination device according to claim 1, wherein the first light-deflecting means is a convex lens, and the light source is placed at the focal point of the convex lens.

3. An illumination device according to claim 1, wherein prism faces of the prism array inclined in the parallel rays are inclined at the angle of 45° or less relative to the optical axis of the parallel rays.

4. An illumination device according to claim 1, wherein the second light-deflecting means comprises a light scattering plane for converting the parallel rays reflected by the reflection plane into scattered light.

5. An illumination device according to claim 1, wherein the reflection plane is curved.

6. An illumination device according to claim 1, wherein the second light-deflecting means is made of glass.

7. An illumination device according to claim 1, wherein the reflection plane is formed of a prism array, and the prism array is coated by reflective metal film.

8. An illumination device according to claim 1, wherein the display panel comprises ferroelectric liquid crystal.

9. An illumination device according to claim 1, wherein the display panel comprises twisted nematic liquid crystal.

10. An illumination device comprising:
   a. a first light source and a second light source;
   b. a display panel having picture elements arranged in rows and columns, each of the picture elements being independently controlled to be either in an open state or in a closed state;
   c. a first light-deflecting means for converting the light emitted from the first light source into a first set of parallel rays, and a second light-deflecting means for converting the light emitted from the second light source into a second set of parallel rays;
   d. a third light-deflecting means having a first reflection plane for directing the first set of parallel rays to the display panel, the first reflection plane being formed by a prism array; and
   e. a fourth light-deflecting means having a second reflection plane for directing the second set of parallel rays to the display panel, the second reflection plane being formed by a second prism array, and the second reflection plane being placed in a position in which the reflected rays from the second reflection plane illuminates the display panel through the third light deflecting means.

11. An illumination device according to claim 10, wherein the first and second light deflecting means are respectively a first and a second convex lenses, and the first and the second light sources are placed respectively at the focal points of the first and the second convex lenses.

12. An illumination device according to claim 10, wherein the prisms faces of the first prism array inclined to the first set of parallel rays are inclined at the angle of 45° or less relative to the optical axis of the first set of parallel rays, and the prism faces of the second prism array inclined to the second set of parallel rays are inclined at the angle of 45° or less relative to the optical axis of the second set of parallel rays.

13. An illumination device according to claim 10, wherein the third light-deflecting means comprises a light scattering plane for converting the rays reflected by the first and the second reflection planes into scattered light.

14. An illumination device according to claim 10, wherein the pitch between the prism in the first prism array is smaller than the pitch in the image elements of the display panel.

* * * * *

UNITED STATES PATENT AND TRADEMARK OFFICE
CERTIFICATE OF CORRECTION

PATENT NO. : 4,737,896

DATED : April 12, 1988

INVENTOR(S) : Noritaka MOCHIZUKI ET AL.

It is certified that error appears in the above-identified patent and that said Letters Patent is hereby corrected as shown below:

COLUMN 1
    Line 34, "totaly" should read --totally--;
    line 37, "152 are" should read --152 leave the curved reflection plane 12 to transmit through a light-diffusing screen 16, whereby the reflected rays 152 are--; and
    line 40, "have" should read -- has--.

COLUMN 2
    Line 16, "illustration" should read --illumination--;
    line 68, "a open' should read --an open--.

COLUMN 3
    Line 11, "a" should be deleted.

COLUMN 4
    Line 2, "brighter or more' should read --or more brighter--.

COLUMN 5
    Line 1, "illuminates" should read--illuminate--;

UNITED STATES PATENT AND TRADEMARK OFFICE
CERTIFICATE OF CORRECTION

PATENT NO. : 4,737,896

DATED : April 12, 1988

INVENTOR(S) : Noritaka Mochizuki et al

It is certified that error appears in the above-identified patent and that said Letters Patent is hereby corrected as shown below:

COLUMN 5, line 10, "prisms" should read --prism--.

Signed and Sealed this

Twenty-fifth Day of October, 1988

Attest:

DONALD J. QUIGG

Attesting Officer     Commissioner of Patents and Trademarks